(12) United States Patent
Sato

(10) Patent No.: US 7,720,263 B2
(45) Date of Patent: May 18, 2010

(54) COLLATION DEVICE, REGISTRATION DEVICE, IMAGE CORRECTING METHOD AND PROGRAM

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1107 days.

(21) Appl. No.: 11/368,619

(22) Filed: Mar. 7, 2006

(65) Prior Publication Data
US 2006/0228004 A1 Oct. 12, 2006

(30) Foreign Application Priority Data
Mar. 9, 2005 (JP) ............... P2005-065821

(51) Int. Cl.
*G06K 9/00* (2006.01)
(52) U.S. Cl. .............. 382/115; 382/116; 382/124; 382/126; 382/127
(58) Field of Classification Search ............... 382/115, 382/116, 124, 126, 127
See application file for complete search history.

(56) References Cited

U.S. PATENT DOCUMENTS 6,898,301 B2 * 5/2005 Iwanaga ............... 382/124

7,260,246 B2 * 8/2007 Fujii ............... 382/124

FOREIGN PATENT DOCUMENTS

JP 2000-22869 1/2000

* cited by examiner

*Primary Examiner*—Sherali Ishrat
*Assistant Examiner*—Mike Rahmjoo
(74) *Attorney, Agent, or Firm*—Finnegan, Henderson, Farabow, Garrett & Dunner, L.L.P.

(57) ABSTRACT

There is provided an authentication device capable of improving an authentication accuracy, in which a finger tilt angle α made by a straight line between the positions at the fingertip abutting portion 6 and the image pickup camera 4 and the finger positioned in the imaging space is detected from a distance D2 (FIG. 5) between the finger positioned in the imaging space and the image pickup camera 4 and the distance D1 (FIG. 5) between the positions at the image pickup camera 4 and the fingertip abutting portion 6. The projection distortion of the corresponding comparative images can be removed according to the difference between the finger tilt angle α and the finger tilt angle α of registration information previously stored at the time of registration.

5 Claims, 7 Drawing Sheets

COLLATION DEVICE, REGISTRATION DEVICE, IMAGE CORRECTING METHOD AND PROGRAM

CROSS REFERENCES TO RELATED APPLICATIONS

The present invention contains subject matter related to Japanese Patent Application JP 2005-065821 filed in the Japanese Patent Office on Mar. 9, 2005, the entire contents of which being incorporated herein by reference.

BACKGROUND OF THE INVENTION

1. Field of the Invention

The present invention relates to collation device, registration device, image correcting method and program, and is suitable for use in an authentication device based on a biometrics authentication.

2. Description of the Related Art

In related art, a blood vessel is one of subjects to biometrics authentication. In general, in an authentication device, a finger, for example, is fixed on an image pickup camera in parallel with the imaging surface thereof to image the blood vessel of the finger to be fixed. The image of the blood vessel obtained as a result of imaging is registered in a memory as information for authenticating the human body imaged at that moment or compared with the registered image of the blood vessel to determine whether to authenticate the registrant or not.

It is inconvenient for a user to fix his or her finger on the image pickup camera in imaging a blood vessel. From a user-friendly point of view, there is a request to position a finger on an image pickup camera without constraint.

When the blood vessel of a finger freely positioned on the image pickup camera is imaged, it is most presumable that a difference can be made in a state where the finger is positioned on the image pickup camera at the times of registration and authentication.

Actually, one of typical differences between states where the finger is positioned at the times of registration and authentication includes an angle made by the imaging surface of the image pickup camera and the finger positioned above the image pickup camera, that is, a tilt of the finger with respect to the imaging surface.

When the finger is imaged while tilted relative to the imaging surface, the finger in an blood-vessel image obtained as a result of imaging is distorted because the contour of the finger corresponding in position to a part nearer to the image pickup camera is longer and that of the finger corresponding in position to a part farther from the image pickup camera is shorter.

In an authentication device, if the distortion of the finger in the image (projection distortion) is caused between the times of registration and authentication, this may cause an inconvenience that the authentication device takes a registrant himself/herself for another person and vice versa. This results in degradation in an authentication accuracy.

As one of methods of removing such projection distortion, the following patent literature discloses a method in which an image is corrected in such a manner that any one of lengths of the contours corresponding in position to a part nearer to the image pickup camera or to a part farther from the image pickup camera is matched to the other (for example, refer to Jpn. Pat. Appln. Laid-Open Publication No. 2000-22869 (FIGS. 11 and 12)

SUMMARY OF THE INVENTION

When a projection distortion resulting from a tilt of the finger relative to the imaging surface is removed by this method, it is difficult for the authentication device to recognize whether the contour of the finger in the image is distorted due to the tilt of the finger or due to the shape of the finger itself.

When the method is applied to the authentication device, even though a projection distortion is actually attributed to the shape of the finger itself, it may be regarded as a projection distortion resulting from the tilt of the finger, as a result, a problem with degradation in an authentication accuracy has not been still resolved.

The present invention has been made in view of the above, and proposes a collation device, registration device, image correcting method, and program capable of improving an authentication accuracy.

According to one embodiment of the present invention, there is provided a collation system for collating a registered image representing a part of the human body to be authenticated with a comparative image compared thereto, including a position indexing portion provided as an index for positioning the part of the human body in an imaging space at the image pickup device, distance detecting means for detecting a distance between the part of the human body positioned in the imaging space and the image pickup device, angle detecting means for detecting an angle made by a straight line between the positions at the position indexing portion and the image pickup device and the part of the human body positioned in the imaging space from the distance and a distance between the positions at the image pickup device and the position indexing portion, and removing means for removing distortion of the registered image or the comparative image according to difference between the angle and the angle corresponding to the registered image.

The collation device is capable of removing projection distortion of the image by the relative ratio in a state where a subject to be authenticated is positioned at the times of registration and collation, so that the collation device is capable of selectively removing projection distortion resulting from change in a state where the subject to be authenticated is positioned from comparison images independently of the shape of the subject to be authenticated.

In addition, according to one embodiment of the present invention, there is provided a registering device for registering a subject to be authenticated in a part of the human body, including a position indexing portion provided as an index for positioning the part of the human body in the imaging space at the image pickup device, distance detecting means for detecting a distance between the part of the human body positioned in the imaging space and the image pickup device, angle detecting means for detecting an angle made by a straight line between the positions at the position indexing portion and the image pickup device and the part of the human body positioned in the imaging space from the distance and a distance between the positions at the image pickup device and the position indexing portion, and registering means for registering the angle correlated with the image representing a subject to be authenticated in a part of the human body imaged by the image pickup device.

In a collation device for collating a comparative image to be compared to such registered image with the registered image, removal of a projection distortion of the registered image or comparative image according to difference between an angle correlated to the registered image and the angle detected at the time of collation as is the case with the registered image enables removing a projection distortion of the image by a relative ratio in a state where a subject to be authenticated is positioned at the times of registration and collation, thereby selectively removing a projection distortion resulting from change in a state where a subject to be authenticated is positioned independently of the shape of the subject to be authenticated from a comparative image.

Furthermore, according to one embodiment of the present invention, there is provided an image correcting method of correcting a comparative image to be compared with a registered image representing a subject to be authenticated in a part of the human body positioned in the imaging space at the image pickup device at the time of registration, including a first step of detecting a distance between a part of the human body positioned in the imaging space and the image pickup device, a second step of detecting an angle made by a straight line between the positions at the position indexing portion and the image pickup device and the part of the human body positioned in the imaging space from the distance and a distance between the positions at the image pickup device and a position indexing portion, and a third step of correcting distortion of the comparative image to offset the difference between the angle and the angle corresponding to the registered image.

The image correcting method, therefore, is capable of removing a projection distortion of the image by a relative ratio in a state where a subject to be authenticated is positioned at the times of registration and collation, thereby selectively removing a projection distortion resulting from change in a state where a subject to be authenticated is positioned independently of the shape of the subject to be authenticated from a comparative image.

Still further, according to one embodiment of the present invention, there is provided a program for correcting a comparative image to be compared with a registered image representing a subject to be authenticated in a part of the human body positioned in the imaging space at the image pickup device at the time of registration causing a computer to execute a first step of detecting a distance between the part of the human body positioned in the imaging space and the image pickup device, a second step of detecting an angle made by a straight line between the positions at the position indexing portion and the image pickup device and the part of the human body positioned in the imaging space from the distance and a distance between the positions at the image pickup device and the position indexing portion, and a third step of correcting distortion of the comparative image to offset the difference between the angle and the angle corresponding to the registered image.

The program therefore can remove a projection distortion of the image by the relative ratio in a state where a subject to be authenticated is positioned at the times of registration and collation, which enables selectively removing the projection distortion resulting from change in a state where the subject to be authenticated is positioned independently of the shape of the subject to be authenticated from a comparative image.

According to one embodiment of the present invention, a distance between a part of the human body positioned in an imaging space and an image pickup device is detected, and then a finger tilt angle made by a straight line between the positions at a position indexing portion and the image pickup device and the part of the human body positioned in an imaging space is detected from the distance and a distance between the positions at the image pickup device and the position indexing portion. Distortion of a registered image or a comparative image is removed according to difference between the angle and the angle corresponding to the registered image, thereby enabling removing a projection distortion of the image by a relative ratio in a state where a subject to be authenticated is positioned at the times of registration and collation, which allowing selectively removing the projection distortion resulting from change in a state where the subject to be authenticated is positioned independently of the shape of the subject to be authenticated from a comparative image, thus realizing a collation device, registration device, image correcting method, and program capable of improving an authentication accuracy.

The nature, principle and utility of the invention will become more apparent from the following detailed description when read in conjunction with the accompanying drawings in which like parts are designated by like reference numerals or characters.

BRIEF DESCTIPTION OF THE DRAWINGS

DETAILED DESCRIPTION OF THE PREFERRED EMBODIMENTS

One embodiment of the present invention is described with reference to the accompanying drawings.

Figure 1:
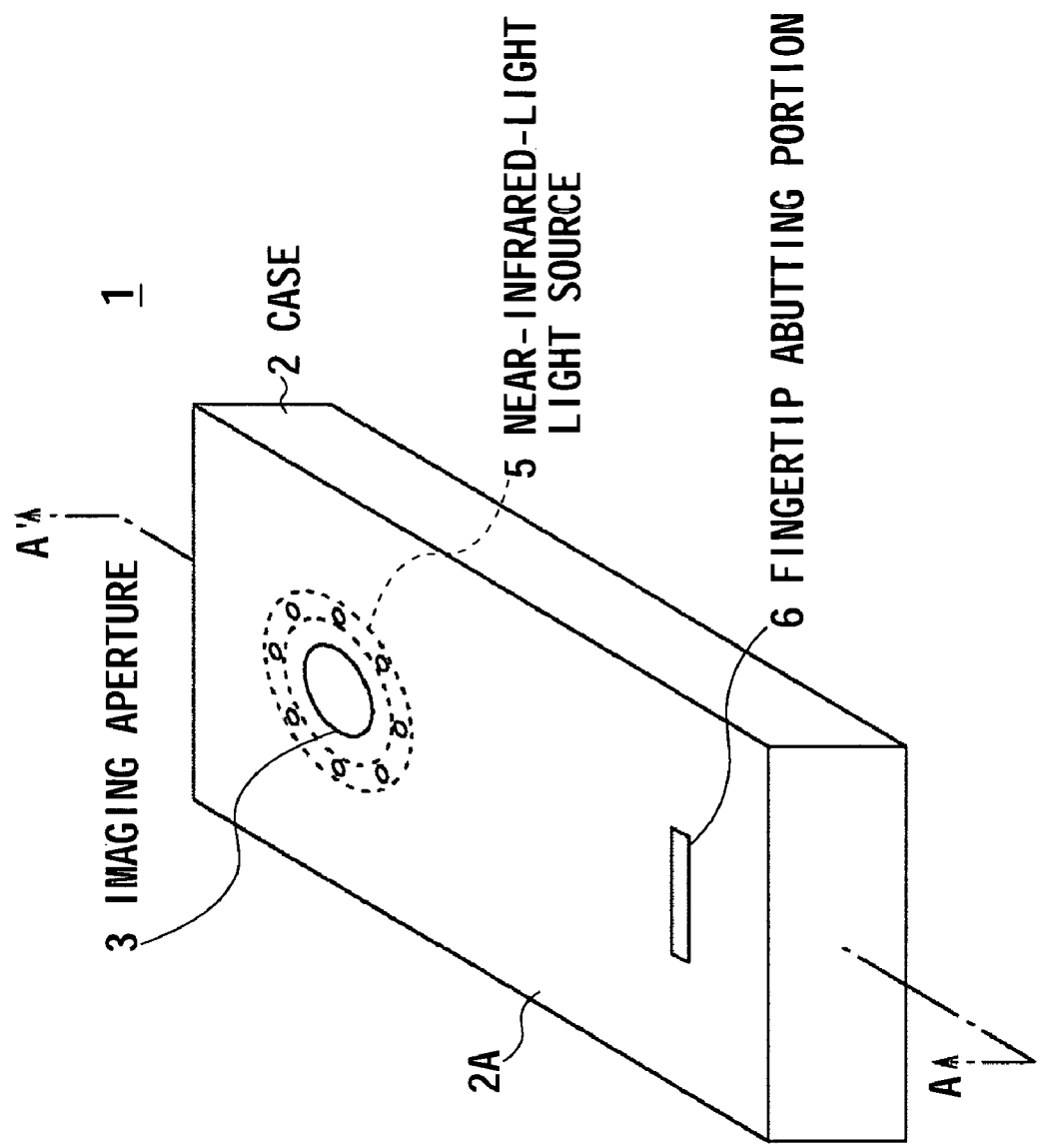
FIG. 1 is a schematic diagram showing a configuration of an authentication device 1.
Figure 2:
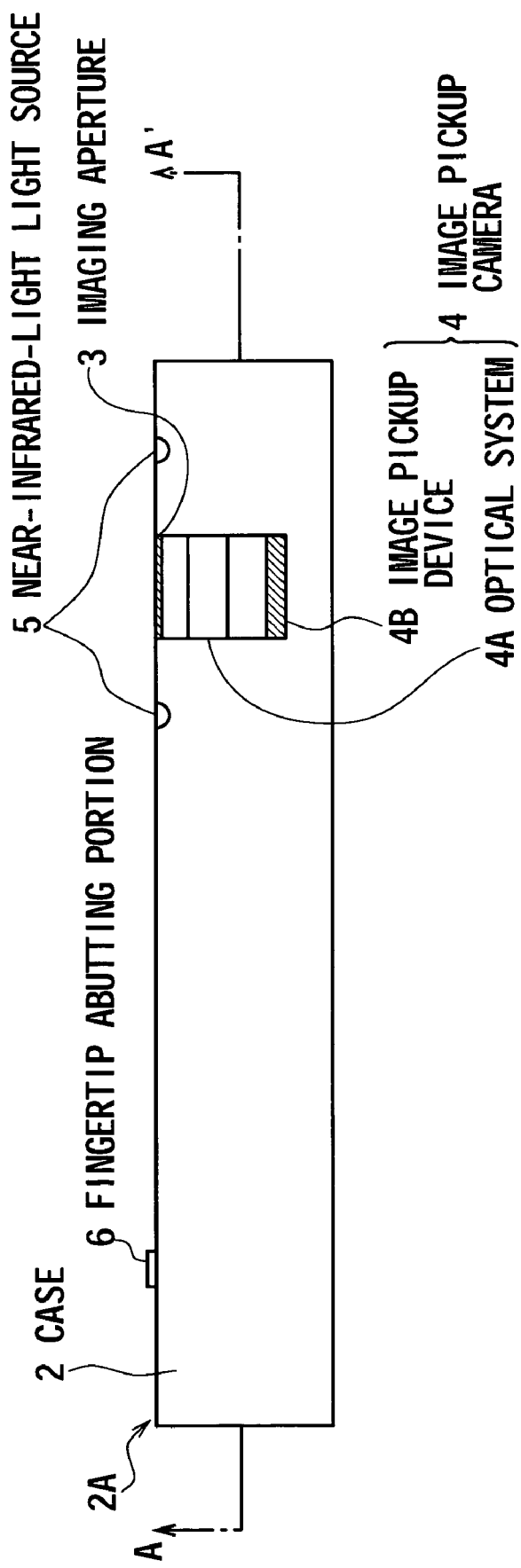
FIG. 2 is a schematic diagram showing a configuration of an authentication device 2.

(1) Outer Configuration of an Authentication Device According to the Present Embodiment In FIG. 1, and FIG. 2 being a section along line A-A' therein, reference numeral 1 denotes a general outer configuration of the authentication device according to the present embodiment. An imaging aperture 3 made of light transmissive material is formed in the vicinity of one latitudinal end of a top face 2A of a case 2 shaped as a substantially rectangular parallelepiped. A camera 4 with which a subject is taken (hereinafter referred to as "image pickup camera") is disposed at a predetermined position inside the case 2 corresponding to the imaging aperture 3.

A plurality of near-infrared-light light sources 5 for irradiating near infrared light specifically absorbed by hemoglobin in the human body to an outer space (hereinafter referred to as "imaging space") above the image pickup camera 4 (above the imaging aperture 3) are provided on the periphery of the imaging aperture 3 on the top face 2A of the case 2.

A linear thin member 6 which a fingertip of a predetermined finger abuts (hereinafter referred to as "fingertip abutting portion") is pasted on the predetermined position of the top face 2A of the case 2 as an index for positioning a finger in the imaging space.

Figure 3:
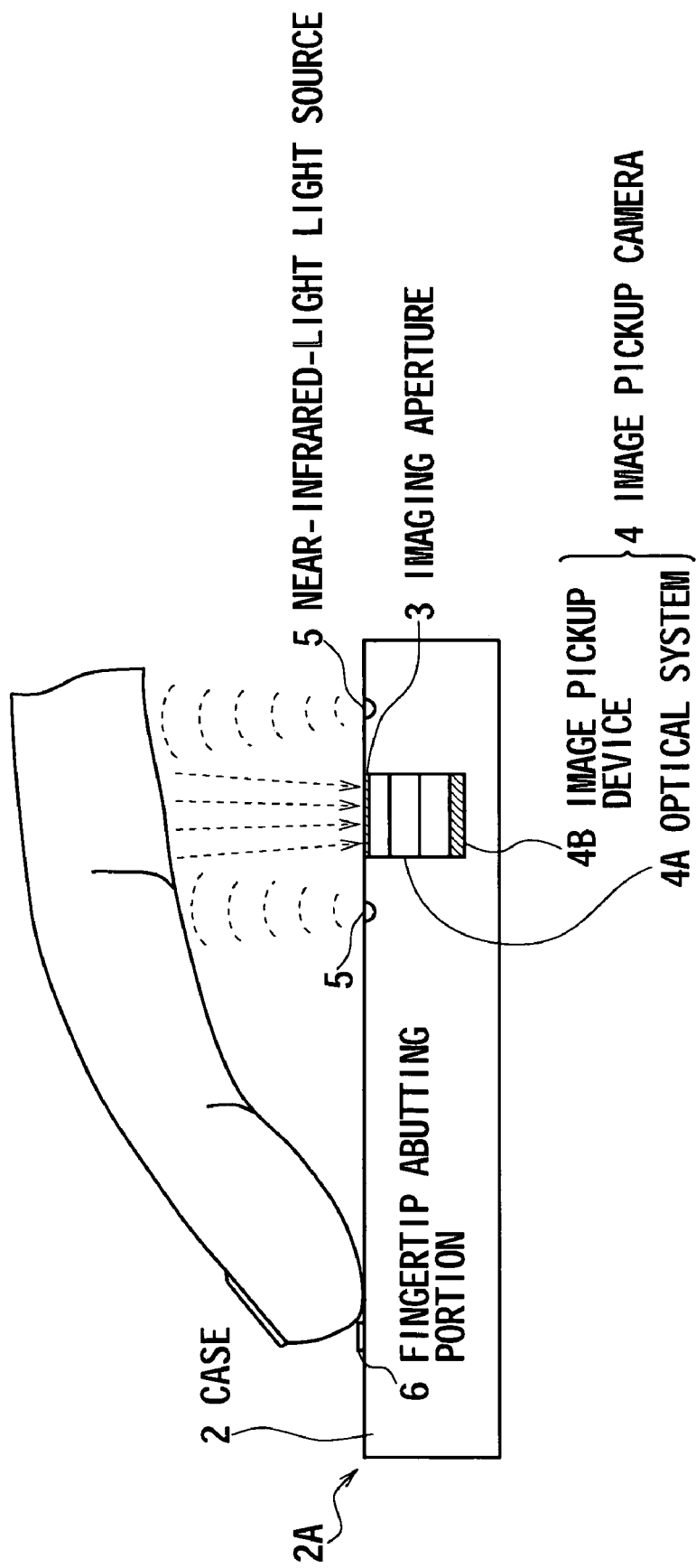
FIG. 3 is a schematic diagram used for describing an optical path of near infrared light.

In the authentication device 1, as shown in FIG. 3, when a finger is positioned in the imaging space with a fingertip abutting the fingertip abutting portion 6, near infrared light irradiated to the finger is absorbed by hemoglobin residing in a vascular tissue inside the finger, reflected or scattered by tissues other than vascular tissues, passes through the finger, and falls on the image pickup camera 4 as near infrared light projecting blood vessels (hereinafter referred to as "blood vessel projecting light").

In this case, the image pickup camera 4 is so configured that a blood vessel projecting light is led to an image pickup device 4B via an optical system 4A and photo-electric conversion results from an image pickup device 4B are outputted to the electronic circuits of the authentication device 1 as a blood vessel image signal.

Thus the authentication device 1 is adapted to image blood vessels residing in the human body.

In the present embodiment, the selected near infrared light irradiated by the near-infrared-light light sources 5 has a wavelength region of 700 nm to 900 nm that is specifically absorbed both by deoxygenation hemoglobin and by oxygenation hemoglobin.

Thus, the authentication device 1 is adapted to more faithfully image the blood vessel in the distal end (finger) of the human body which has both the venous and the arterial blood.

Figure 4:
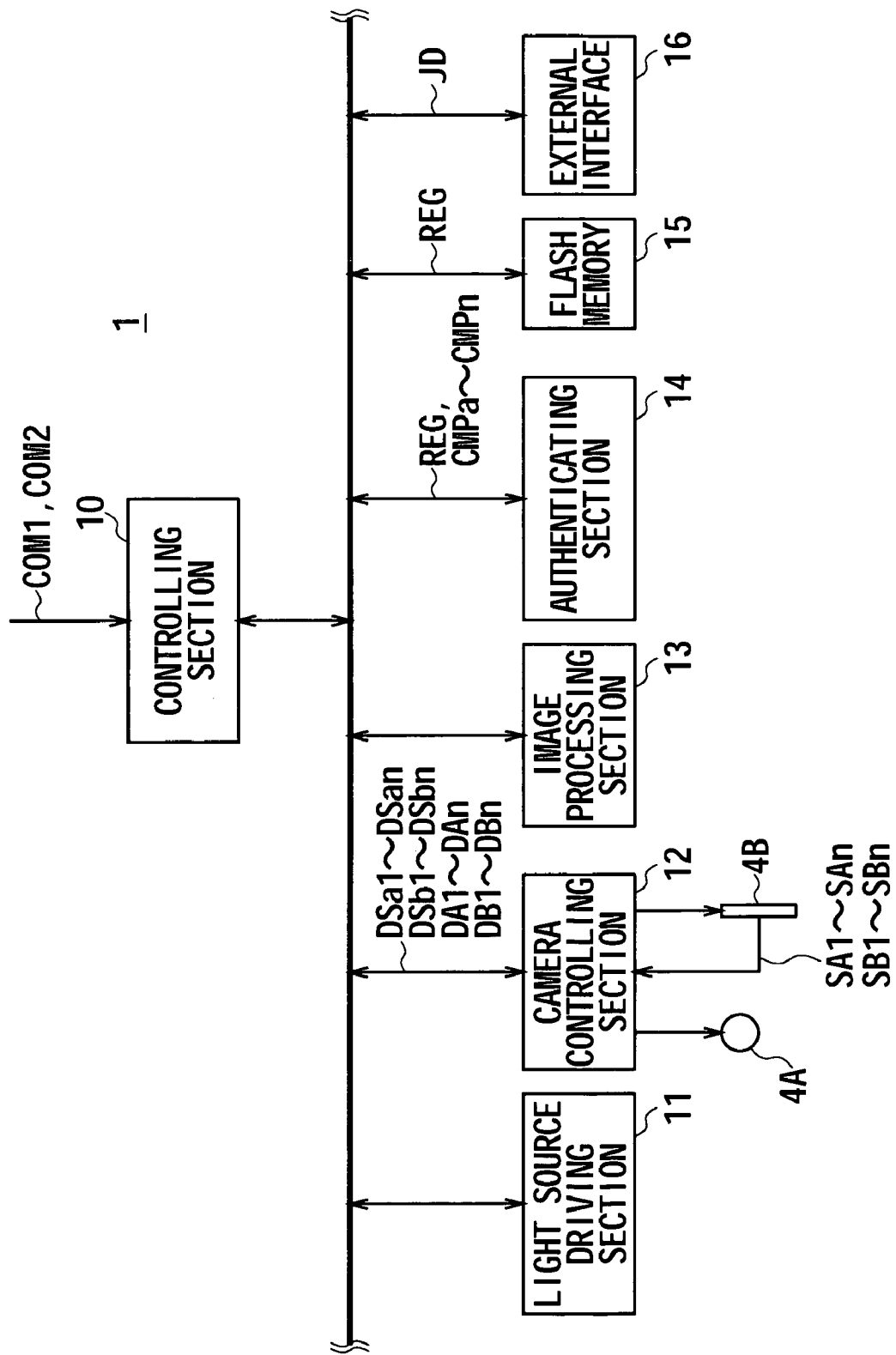
FIG. 4 is a block diagram showing a circuit configuration of an authentication device.

(2) Circuit Configuration of the Authentication Device According to the Present Embodiment The circuit configuration of the authentication device 1 is shown in FIG. 4. In FIG. 4, the authentication device 1 is so configured that a controlling section 10 is connected to an interface 16 for transmitting and receiving data to and from a light source driving section 11, camera controlling section 12, image processing section 13, authenticating section 14, flash memory 15, and external circuitry (hereinafter referred to as "external interface") via a transmission line.

The controlling section 10 is structured by a computer including a Central Processing Unit (CPU) for controlling the entire authentication device 1, Read Only Memory (ROM) for storing various types of programs, and Random Access Memory (RAM) as a work memory for the CPU. An operating section (not shown) disposed in a predetermined position on the case 2 for the authentication device 1 provides the controlling section 10 with a run command COM1 of a mode in which the blood vessel of a registrant is registered (hereinafter referred to as "blood vessel registration mode") or with a run command COM2 of a mode in which a registrant is determined (hereinafter referred to as "authentication mode" in response to user's operation.

The controlling section 10 determines a mode to be executed in accordance with the run commands COM1 and COM2 and properly controls the light source driving section 11, camera controlling section 12, image processing section 13, authenticating section 14, flash memory 15, external interface 16 according to programs corresponding to the determination.

That is to say, when the controlling section 10 selects the blood vessel registration mode as a mode to be executed, the controlling section 10 transfers an operation mode to the blood vessel registration mode to control the light source driving section 11, camera controlling section 12, and image processing section 13.

At this point, the light source driving section 11 drives and turns on the near-infrared-light light sources 5. As a result, near infrared light is irradiated to a finger (FIG. 3) positioned in the imaging space. The blood vessel projecting light obtained via the finger falls on the image pickup device 4B of the image pickup camera 4 and photoelectrically converted by the image pickup device 4B.

The camera controlling section 12 controls timings for outputting electric charges with which the image pickup device 4B is charged by the photoelectric conversion as a blood vessel image signal and properly adjusts the position of the focus lens in the optical system 4A (FIG. 2) according to the contrast of the image represented in the blood vessel image signals SA1 to SAn (SA1, SA2, ..., SAn) sequentially outputted from the image pickup device 4B to focus on the finger positioned in the imaging space.

After the position of lens has been adjusted, the camera controlling section 12 sends corresponding data DA1 to DAn of the blood vessel image signals SA1 to SAn and sequentially outputted from the image pickup device 4B (hereinafter referred to as "blood vessel image data") to the image processing section 13.

Each time the camera controlling section 12 adjusts the position of the focus lens, the camera controlling section 12 sends data DS1$a$ to DS1$n$ (hereinafter referred to as "lens-to-finger distance data") on distances from the top face 2A to the finger face corresponding to the lens position to the image processing section 13.

Figure 5:
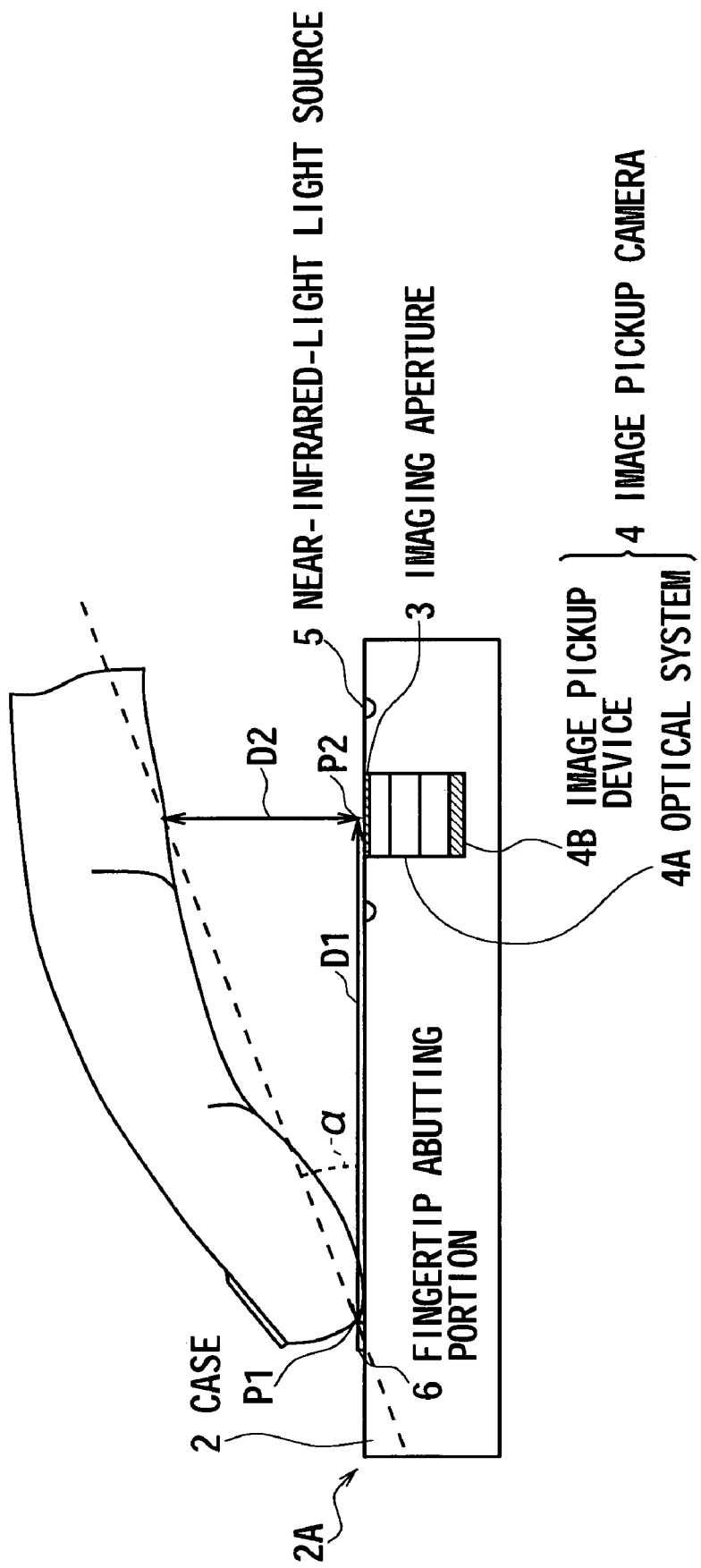
FIG. 5 is a schematic diagram used for describing the detection of the tilt of a finger.

As shown in FIG. 5, the image processing section 13 stores a linear distance D1 between a position P1 at the fingertip abutting portion 6 and a position P2 at which a perpendicular passing through the center of the imaging surface of the image pickup device 4B intersects with the top face 2A as data in an internal memory. The image processing section 13 detects an angle α made by the finger positioned in the imaging space and the top face 2A (hereinafter referred to as "finger tilt angle") based on the liner distance D1 and a distance D2 expressed as the lens-to-finger distance data DS1 (DS1$a$ to DS1$n$) fed by the camera controlling section 12. In the authentication device 1, each time the finger (FIG. 3) positioned in the imaging space changes in tilt with respect to the imaging surface of the image pickup device 4B, the finger tilt angles α representing the tilt are detected.

Figure 6A:
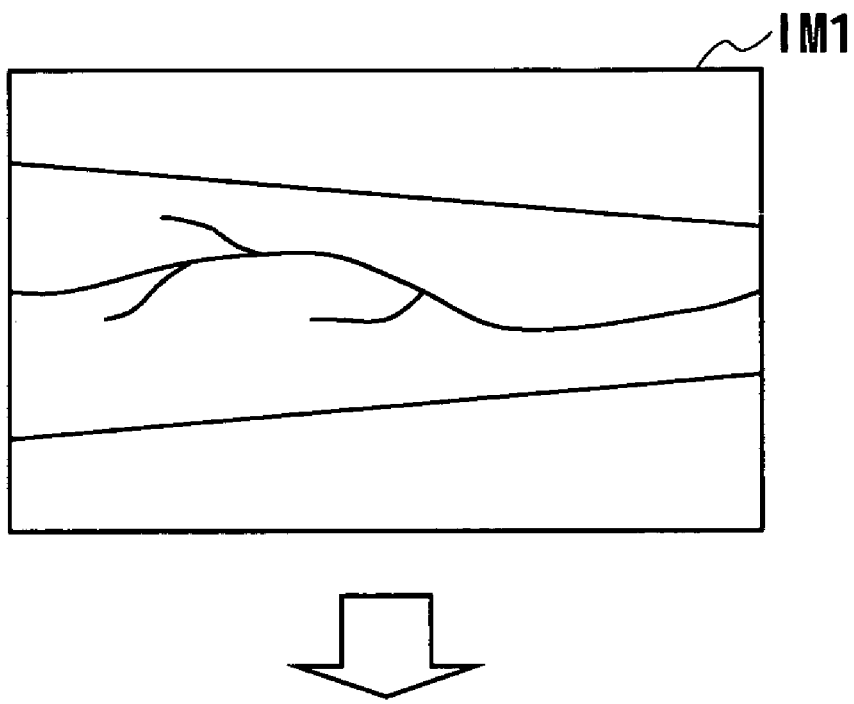
FIG. 6A is a schematic diagram showing an image with projection distortion

The image processing section 13 selects one blood vessel image data DA (DA1, DA2, ..., or DAn) corresponding to the smallest finger tilt angle in these finger tilt angles α and subjects the blood vessel image data DA to various filtering processes, binary process, blood vessel linearizing process called morphology corresponding to for example the rotational correction and the contour enhancement of the finger in a predetermined order. As the result, for example, as shown in FIG. 6A, a blood vessel in an image IM1 represented in the blood vessel image signal SA is visualized. Since the visualized blood vessel is formed by a pattern inherent in the human body, the image IM1 including the blood vessel can be used for identification of the human body whose finger is positioned in the imaging space.

The image processing section 13 forms data expressing such image IM1, data signifying the smallest finger tilt angle α, and data indicating a correlation between the two into an registration information REG (FIG. 4) and sends the information to the controlling section 10.

The controlling section 10 controls the light source driving section 11, camera controlling section 12, and image processing section 13 in the manner described above. When the controlling section 10 receives the registration information REG from the image processing section 13, the controlling section 10 then controls the flash memory 15 instead of the light source driving section 11, camera controlling section 12, and image processing section 13 to store and register the registration information REG in the flash memory 15.

The controlling section 10 is thus adapted to implement the blood vessel registration mode.

When the controlling section 10 has selected the authentication mode as a mode to be executed, the controlling section 10 shifts into the authentication mode to control each of the light source driving section 11, camera controlling section 12, and image processing section 13, reads the registration information REG stored in the flash memory 15, and sends the registration information to the authenticating section 14.

In this case, the light source driving section 11 drives the near-infrared-light light sources 5 as is the case with the aforementioned blood vessel registration mode. The camera controlling section 12 properly adjusts the position of the focus lens of the optical system 4A (FIG. 2) based on the blood vessel image signals SB1 to SBn sequentially outputted from the image pickup device 4B as is the case with the foregoing blood vessel registration mode.

The camera controlling section 12 sends the blood vessel image signals SB1 to SBn (the blood vessel image data DB1 to DBn) obtained after the lens position has been adjusted to the image processing section 13 as is the case with the above blood vessel registration, and also sends the lens-to-finger distance data DS2 (DS2a to DS2n) representing a distance from the top face 2A to the finger surface corresponding to the lens position of the focus lens during the adjustment to the image processing section 13.

The image processing section 13 detects the finger tilt angle α (FIG. 5) of the finger positioned in the imaging space at this time based on the lens-to-finger distance data DS2 (DS2a to DS2n) supplied from the camera controlling section 12 as is the case with the above blood vessel registration mode.

The image processing section 13 visualizes the blood vessel in the image represented in one blood vessel image data DB (DB1, DB2, ..., or DBn) corresponding to the detected finger tilt angles α respectively.

The image processing section 13 forms data signifying the finger tilt angle α, data representing the blood vessel image data DB (visualized image) corresponding to the finger tilt angle α, and data indicating a correlation between the two into an comparative information CMPa to CMPn to be used for comparison with the registration information REG and sends the information to the authenticating section 14.

That is to say, in the authentication device 1, each time the finger positioned in the imaging space (FIG. 3) changes in tilt with respect to the imaging surface of the image pickup device 4B, plural pieces of the comparative information CMP (CMPa to CMPn) are generated including the finger tilt angle α representing the tilt and visualized blood-vessel images corresponding to the finger tilt angle.

The authenticating section 14 calculates an angular difference between the finger tilt angle signified in the comparative information CMP (CMPa to CMPn) and the finger tilt angle α (FIG. 5) represented in the registration information REG read from the flash memory 15 and corrects corresponding images expressed in the comparative information CMP respectively so as to offset the angle difference. More specifically, for example, the position of a targeted pixel in an image represented in the comparative information CMP is corrected with consideration for a distance from and an angular difference with a reference pixel.

Figure 6B:
FIG. 6B is a schematic diagram showing an image after correcting the projection distortion.
Figure 6B:
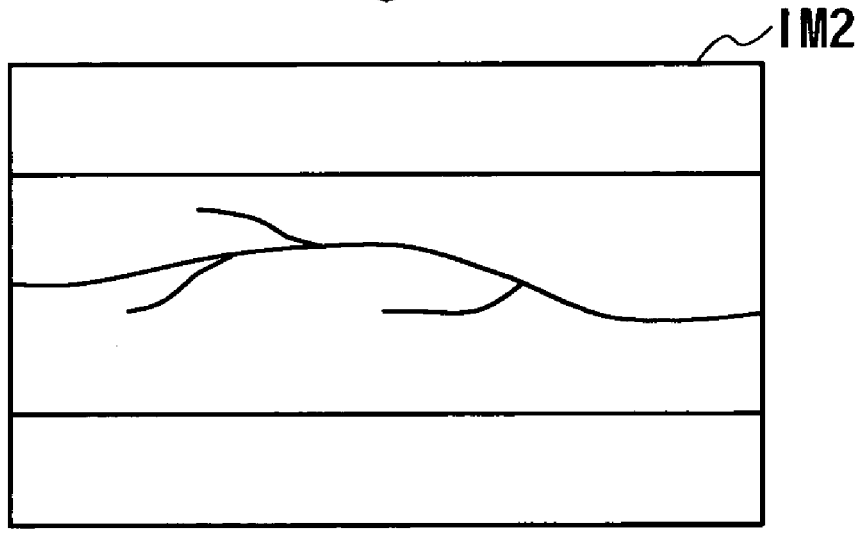

As a result, for example, as shown in FIG. 6B, in the images IM2 after correction in the above manner, the distortion of the blood vessel in the image (projection distortion) is removed and the image IM2 becomes equivalent to the registered image IM1 (FIG. 6A).

The authenticating section 14 collates blood vessel forming patterns in the corrected images IM2 and in the image IM1 represented in the registration information REG with each other respectively, determines whether a person taken with the image pickup camera 4 is a registrant or not according to the matching degrees, and sends determined results to the controlling section 10 as an determination data JD.

The controlling section 10 controls the camera controlling section 12, image processing section 13, and the authenticating section 14 in the manner described above. When the controlling section 10 receives the determination data JD from the authenticating section 14, the controlling section 10 controls the external interface 16 instead of the light source driving section 11, camera controlling section 12, image processing section 13, and the authenticating section 14 and transfers the determination data JD to eternal circuitry through the external interface 16.

The controlling section 10 is thus adapted to execute the authentication mode.

The authentication device 1 executes a biometrics authentication in which a plurality of blood vessels being an inherent structure residing inside a finger are authenticated as to whether an examinee is really the registrant. Therefore, the authentication device 1 is capable of more effectively preventing the stealing directly from the human body and identity theft in which a dishonest person pretends to be a registrant, as compared with a method of authenticating the fingerprint and the like of a biological surface.

(3) Operation and Effect

In the authentication device 1 with the foregoing configuration and at the time of collation (in the authentication mode), a fingertip abutting portion 6 is provided on the top face 2A as an index for positioning the finger in the imaging space, a distance D2 (FIG. 5) between the finger positioned in the imaging space and the image pickup camera 4 is detected, and the finger tilt angle α made by a straight line between the positions at the fingertip abutting portion 6 and the image pickup camera 4 and the finger positioned in the imaging space is detected from the distance D2 and a distance D1 (FIG. 5) between the positions at the image pickup camera 4 and the fingertip abutting portion 6.

The authentication device 1 then removes the projection distortion of image of the corresponding blood vessel image data DB outputted from the image pickup device 4B to be compared with the registration information REG according to the difference between the above finger tilt angle α and the finger tilt angle α in the registration information REG previously stored at the time of registration (in the blood registration mode).

Consequently, the authentication device 1 is capable of removing projection distortion of the image according to a relative ratio of tilt of the finger (FIG. 3) positioned in the imaging space with respect to the image pickup device 4B at the times of registration and collation. This means that the authentication device 1 does not erroneously correct a distortion resulting from the shape of the finger itself regarded as distortion attributed to the finger tilt instead of projection distortion.

The authentication device 1 is thus capable of removing the projection distortion of an image according to the relative ratio of the tilt of the finger (FIG. 3) at the times of registration and collation, so that the authentication device 1 enables selectively removing the projection distortion resulting from change in a state where the finger is positioned independently of the shape of the finger from comparative images, which leading to improvement in an authentication accuracy.

In addition, the authentication device 1 sequentially detects the distance D2 between the finger positioned in the imaging space and the image pickup camera 4 each time the position of the finger changes, and also detects the finger tilt angles α from the distance D2 and the distance D1. The authentication device 1 corrects the projection distortion of an image in the corresponding blood vessel image data DB according to the difference between the finger tilt angles α and the finger tilt angle α in the registration information REG.

The authentication device 1 therefore does not force a finger to be fixed in the imaging space for a given time and is capable of selectively removing the projection distortion resulting from change in a state where the finger is positioned from comparative images, thereby improving an authentication accuracy.

According to the above configuration, the finger tilt angle α made by a straight line between the positions at the fingertip abutting portion 6 and the image pickup camera 4 and the finger positioned in the imaging space is detected from the distance D2 (FIG. 5) between the finger positioned in the imaging space and the image pickup camera 4 and the distance D1 (FIG. 5) between the positions at the image pickup camera 4 and the fingertip abutting portion 6. The projection distortion of the corresponding comparative images can be removed according to the difference between the finger tilt angle α and the finger tilt angle α of the registration information REG previously stored at the time of registration (in the blood registration mode), thereby enabling removing the distortion of the image according to a relative ratio in a state where the finger is positioned at the times of registration and collation, allowing selectively removing the projection distortion resulting from change in a state where the finger is positioned independently of the shape of the finger from comparative images. This realizes the authentication device 1 capable of improving an authentication accuracy.

(4) Other Embodiments

While the above embodiment describes the case where a linear thin member (the fingertip abutting portion 6) which a fingertip abuts as a position indexing portion being an index for positioning a part of the human body in the imaging space at the image pickup camera 4 as an image pickup device is pasted to position the finger in the imaging space, the present invention is not limited to the above but an position indexing portion in various forms other than the above may be provided.

While the above embodiment applies a finger as a subject to be positioned in the imaging space, the present invention is not limited to the above but is applicable to various parts of the human body, such as a hand, eye, or arm other than the above.

Figure 7:
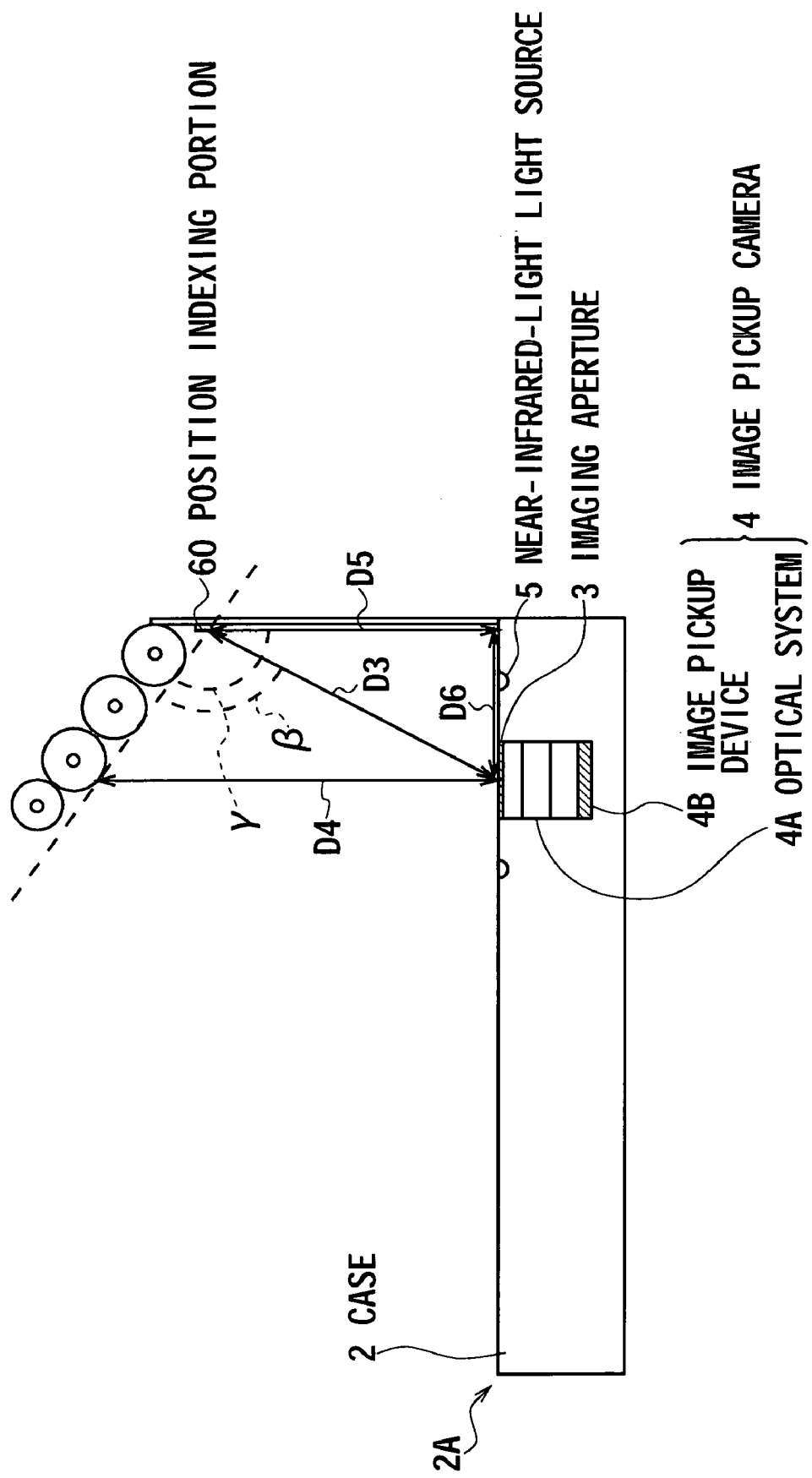
FIG. 7 is a schematic diagram used for describing the detection of tilt of a finger according to another embodiment of the present invention.

While the above embodiment uses the fingertip abutting portion 6 for positioning a part of the human body in the imaging space, the present invention is not limited to the above, but, as shown in FIG. 7, for example, a position indexing portion 60 where the side of a hand abuts, a finger abutting portion (not shown) where a part of the joint of a hand abuts, or a position indexing portion (not shown) where an elbow of an arm abuts may be applied, alternatively, a position indexing portion (not shown) as an index for positioning a part of the human body in the imaging space without abutting can be applied.

Furthermore, in the above embodiment, while the fingertip abutting portion is pasted on the top face 2A of the case 2 as a position indexing portion, the present invention is not limited to the above, a fingertip abutting portion can be fixed for example in the space above the top face 2A, or embedded in the surface of the top face 2A.

For the structure of the position indexing portion, while the present embodiment uses a linear thin member, the present invention is not limited to the above, for example, various shapes such as annularity, arrow, and shape of surface which a part of the human body abuts may be applied, moreover, an optical member like a light source can be applied.

While the above embodiment describes an application in which a distance between a part of the human body positioned in the imaging space and the image pickup device is detected by a distance detecting device for detecting the distance according to the position of the focus lens, the present invention is not limited to the above, but the distance may be detected according to the turnaround time of a supersonic wave emitted to for example a part of the human body.

In the above embodiment, as shown in FIG. 5, while the above embodiment describes the case where a finger tilt angle α representing the tilt of the finger relative to the imaging surface of the image pickup camera 4 is detected from the distance D2 between the finger positioned in the imaging space and the image pickup camera 4 and from the distance D1 between the positions at the image pickup camera 4 and the fingertip abutting portion 6, as an angle detecting section for detecting an angle made by a straight line between the positions at the position indexing portion and the image pickup device and the part of the human body positioned in the imaging space from the distance detected by the distance detecting section and the distance between the positions at the image pickup device and the position indexing portion, the present invention is not limited to the above, for example, as shown in FIG. 7, a finger tilt angle β made by a straight line and the finger can be detected from a distance D4 between the finger positioned in the imaging space and the image pickup camera 4 and a linear distance D3 between the positions at the image pickup camera 4 and the position indexing portion 60.

As shown in FIG. 7, a finger tilt angle γ made by a straight line corresponding to a distance D5 and the finger can be detected from the distance D4, a distance D5 from the position at the position indexing portion 60 to an intersection point where a perpendicular passing through the position interests with the top face 2A, and a distance D6 from the intersection point to the image pickup camera 4. This also produces the same effect as is the case with the above embodiment.

While the above embodiment further describes the case where the projection distortion of an image represented in the blood vessel data DB is corrected in a manner that a difference is offset, as a method of removing distortion of a registered image or comparative image according to the difference between the angle detected by the angle detecting section and the angle corresponding to the registered image, the present invention is not limited to the above, it is allowable to notify differences in a state where the part of the human body is positioned in the imaging space between the current moment and the time of registration. Specifically, it is allowable to notify the extent of differences in a state where the part of the human body is positioned in the imaging space between the current moment and the time of registration with voice or image display according to the difference between the above angle sequentially detected by the angle detecting section and the angle corresponding to the registered image.

While the above embodiment still further describes the case where a collation device for collating a registered image representing a part of the human body to be authenticated with a comparative image to be compared to the registered image is applied to the authentication device 1 with both of the collation function and the registration function for registering registered image, even a single collation device having the collation function or even a single registration device having the registration function can be applied to an embodiment of the present invention.

While the above embodiment describes the case where blood vessels are authenticated, the present invention is not limited to the above, for example, nerves in the human body, fingerprint and lipprint on the human body and others can be authenticated. Incidentally when nerves are authenticated, for example, markers specifically reactive to nerves are injected into a body to image the marker, thereby enabling authenticating nerves as is the case with the above embodiment.

The present invention is applicable to a field of a biometric authentication.

It should be understood by those skilled in the art that various modifications, combinations, sub-combinations and alterations may occur depending on design requirements and other factors insofar as they are within the scope of the appended claims or the equivalents thereof.

What is claimed is:

1. A collation system for collating a registered image representing a part of the human body to be authenticated with a comparative image comprising:
   a position indexing portion provided as an index for positioning the part of the human body in an imaging space at image pickup means;
   distance detecting means for detecting a distance between the part of the human body positioned in the imaging space and the image pickup means;
   angle detecting means for detecting an angle made by a first straight line and a second straight line, the first straight line extending from the position indexing portion to the image pickup means, and the second straight line extending from the position indexing portion to the part of the human body, using distance determined by distance direction means and a distance between the image pickup means and the position indexing portion; and
   removing means for removing distortion of the registered image or the comparative image according to a difference between the angle determined by the angle detecting means and an angle corresponding to the registered image.

2. The collation system according to claim 1, wherein
the removing means comprises correcting means for correcting distortion of the registered image or the comparative image to offset the difference between the angle determined by the angle detecting means and the angle corresponding to the registered image.

3. The collation system according to claim 2, wherein
the distance detecting means sequentially detects the distance each time a position changes where the part of the human body is positioned in the imaging space, and
the correcting means corrects distortion of the corresponding comparative images obtained as a result of a sequential imaging with the image pickup means according to the difference between the angle sequentially detected with the angle detecting means and the angle corresponding to the registered image to offset the difference.

4. The collation system according to claim 2, wherein
the distance detecting means sequentially detects the distance each time a position changes where the part of the human body is positioned in the imaging space, and
a notification means notifies an extent of differences in a state where the part of the human body is positioned in the imaging space between a current moment and a time of registration according to the difference between the angel sequentially detected with the angle detecting means and the angle corresponding to the registered image.

5. The collation system according to claim 1, wherein
the removing means comprises notification means for notifying differences in a state where the part of the human body is positioned in the imaging space between a current moment and a time of the registration.

* * * * *